(No Model.) 2 Sheets—Sheet 2.
N. CURTIS.
PIPE COUPLING FOR RAILWAY TRAINS.
No. 376,075. Patented Jan. 10, 1888.
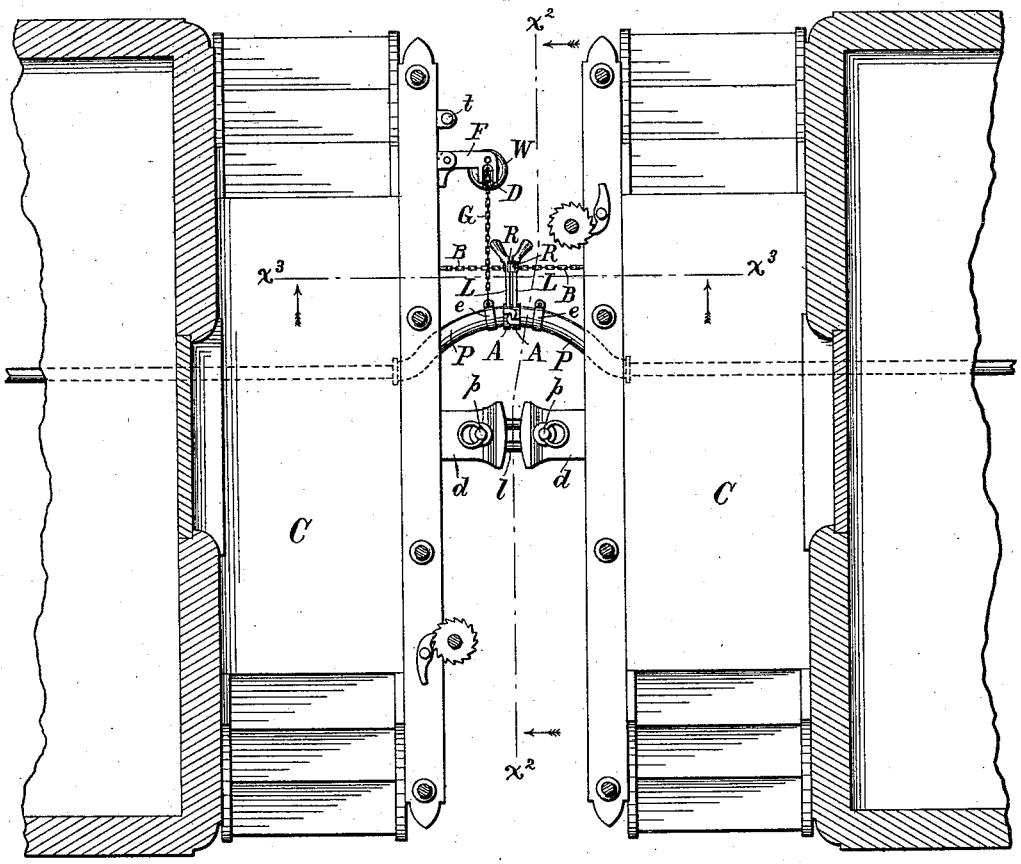
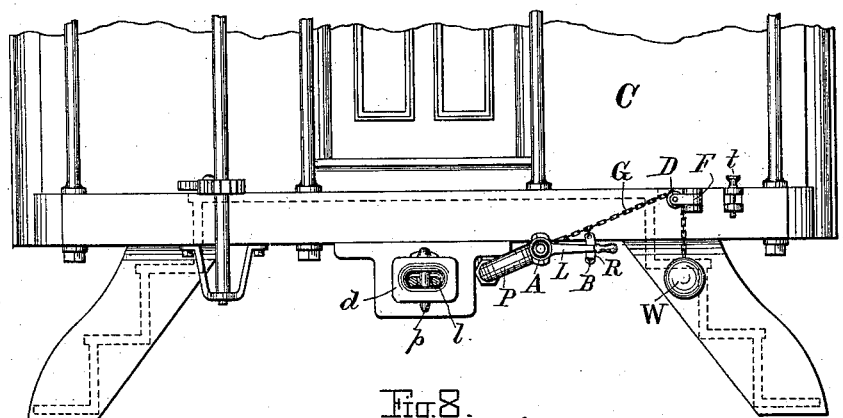
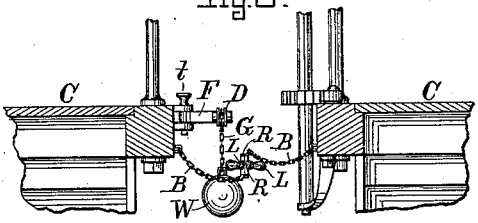
Witnesses
J Edwards Makepeace
Walpon Bates
Inventor
Nelson Curtis

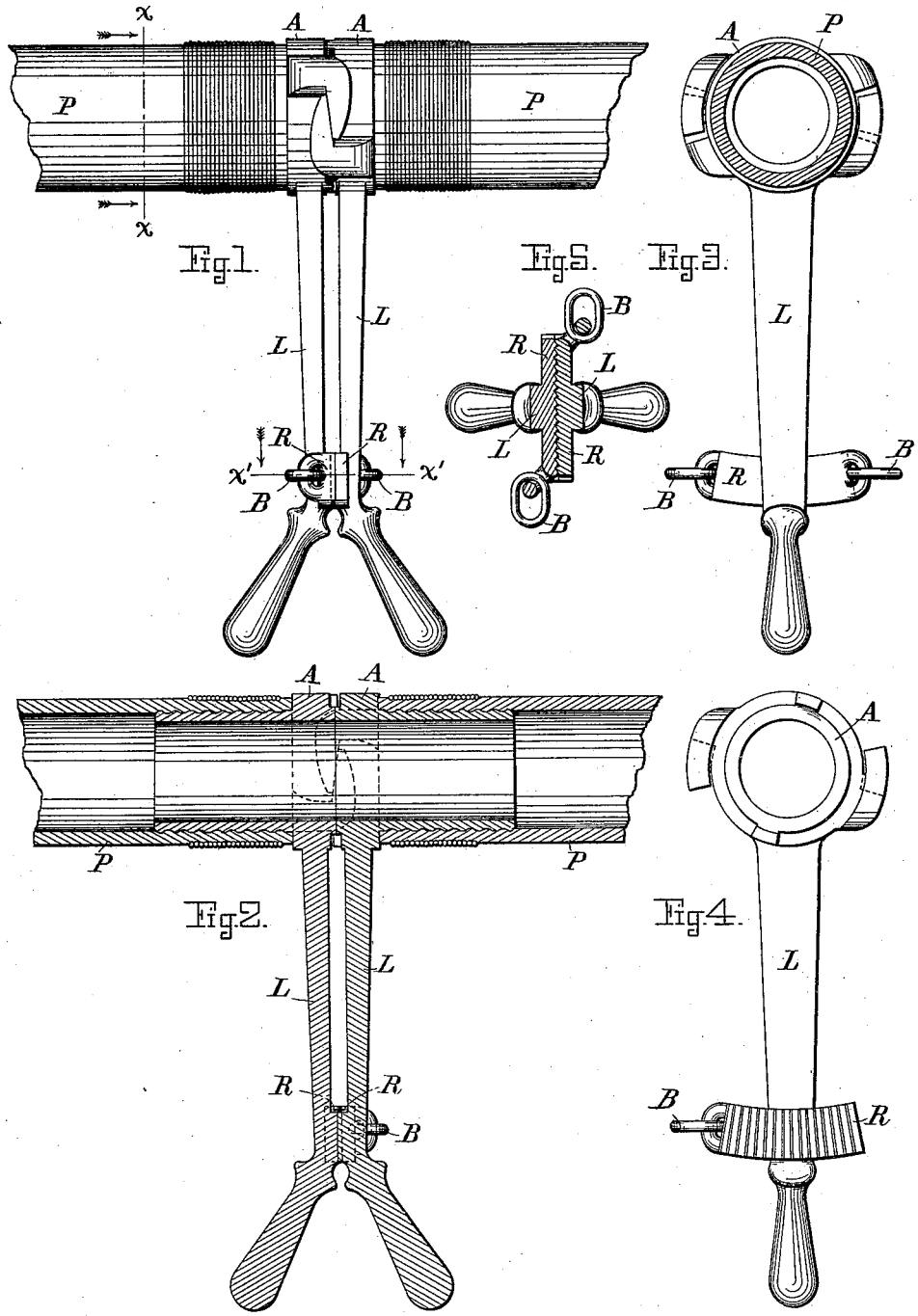

UNITED STATES PATENT OFFICE.

NELSON CURTIS, OF BOSTON, MASSACHUSETTS.

PIPE-COUPLING FOR RAILWAY-TRAINS.

SPECIFICATION forming part of Letters Patent No. 376,075, dated January 10, 1888.

Application filed August 9, 1887. Serial No. 246,490. (No model.)

*To all whom it may concern:*

Be it known that I, NELSON CURTIS, of Boston, Massachusetts, have invented a new and useful Improvement in Pipe-Couplings for Railway-Trains, of which the following is a specification.

The invention relates, first, to means for coupling the ends of two flexible pipes in use between the cars in piping systems in railway-trains; secondly, to means for automatically uncoupling the same.

First, to the half-coupling on the end of each flexible pipe is rigidly secured a hand-lever, and when the two half-couplings are slid together or turned into each other the two hand-levers spring past one another or otherwise lock to hold the half-couplings together; second, a short chain connects the free end or locking mechanism of each hand-lever with its respective car, so that when the cars are pulled apart the two chains, becoming taut before the united flexible pipes are straightened out or come under strain, pull apart or unlock the two levers and compel the two half-couplings to separate.

In the drawings, Figure 1 is full view of two flexible pipes coupled according to my invention. Fig. 2 is a central longitudinal section of the same. Fig. 3 is a section on line $x\ x$ of Fig. 1, or it may be regarded as an end view of apparatus shown in Fig. 1, looking in either direction. Fig. 4 is a face view of either half-coupling. Fig. 5 is a section on line $x'\ x'$ of Fig. 1. Fig. 6 is a plan view of the ends of two cars shackled together and provided with flexible pipes coupled and held in position according to my invention. Fig. 7 is a view on line $x^2\ x^2$ of Fig. 6, or is an end view of one of the cars, showing one-half of the coupling in position with weight. Fig. 8 is a section on line $x^3\ x^3$ of Fig. 6.

C C are two cars, united, as shown, by an ordinary link-and-pin car-coupling, $d\ d$ being draw-bars, $l$ the link, and $p\ p$ the pins.

P P are the flexible pipes, one for each car. Each flexible pipe P is provided with a half-coupling, A, secured thereto as shown, or in any suitable manner.

L L are two hand-levers projecting from each half-coupling A.

R R are two toothed friction-plates, with one of which each hand-lever is provided at or near its free end, the said two plates R R being held in firm or locked contact when the two half-couplings A A are jammed together.

B B are two chains, one for each car, and each chain extending from the end of its respective car to the friction-plate or locking mechanism of the half-coupling of the flexible pipe belonging to that car.

D is a friction-roll in a bracket, F, secured to one of the cars. G is a chain running over said roll, and having at one end a weight, W, while the other end is hooked into an eye, $e$, in a collar on and near the end of one of the flexible pipes P, the said weight being sufficiently heavy to prevent the coupling and flexible pipes from falling below the general level of the piping system of the cars.

The bracket F is a swinging bracket, and when not in use may be locked against its car by a pin, $t$.

The mode of operation by which the two flexible pipes are covered is obvious from the above description, and it is also obvious that the two pipes, when coupled, may be separated by the train-man forcing the two levers in opposite directions. When, however, the chains B B are used, the uncoupling of the pipes may be automatic, the length of the chains being, as before stated, such that they become taut and pull the levers apart and uncouple the flexible pipes before there is any strain upon the latter.

I claim—

1. The combination, with the flexible pipes P P and half-couplings A A upon the ends of said pipes, of the levers L L, projecting one from each half-coupling, and each provided near its free end with a friction-plate or locking mechanism, R, substantially as described.

2. In a pipe-coupling between two cars, the combination, with two flexible pipes, half-couplings at their respective free ends, and levers projecting one from each half-coupling, and each carrying a locking mechanism near its free end, substantially as described, of two chains, B B, one for each car, and each chain extending from the end of its respective car to the locking mechanism of the lever belonging to that car, whereby the half-couplings may be unlocked and separated before the flexible pipes become taut, substantially as described.

NELSON CURTIS.

Witnesses:
W. W. SWAN,
WALDRON BATES.